Figures 1, 3:
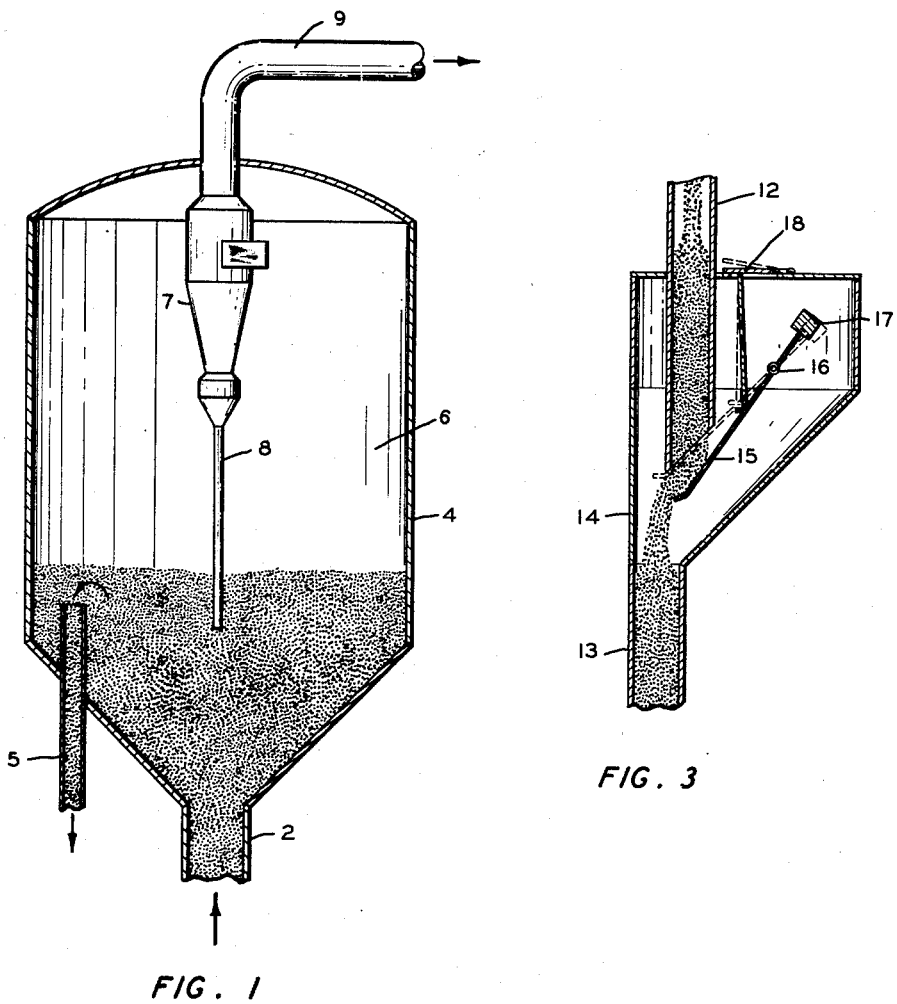

Dec. 28, 1954   J. M. BROOKE   2,698,224
CATALYST BACKFLOW PREVENTION DEVICE
Filed Dec. 18, 1951   2 Sheets-Sheet 1

INVENTOR.
J.M. BROOKE
BY
Hudson & Young
ATTORNEYS

INVENTOR.
J. M. BROOKE
BY Hudson & Young
ATTORNEYS

United States Patent Office 2,698,224
Patented Dec. 28, 1954

2,698,224
CATALYST BACKFLOW PREVENTION DEVICE

Jesse M. Brooke, Old Ocean, Tex., assignor to Phillips Petroleum Company, a corporation of Delaware Application December 18, 1951, Serial No. 262,230

5 Claims. (Cl. 23—288)

This invention relates to a method and device for the separation of finely divided solid particles from gases or vapors in which the said particles are suspended. In one of its aspects the invention relates to a method and device including centrifugal or other solids-from-fluids separating steps or means which when operated produce a pressure differential which, as later described herein, operates to impede the best operation of said methods and means. In another of its aspects the invention relates to a method and means for preventing the flow of fluids, caused by the said pressure differential, into the solids-from-fluids separating step or means by way of the separated solids discharge from said separating step or means.

The separation of particulate solids from fluids such as gases or vapors is an old and well known art which has been practiced in the chemical and petroleum industries and in operations of widely differing characters. One of the important processes involving the separation of finely-divided solids from fluids such as gases or vapors is the petroleum hydrocarbon conversion operation as it is practiced in its several forms throughout the petroleum refining arts and, therefore, the present invention will be set forth and described in its application to said processes. The readers will bear in mind that the application of the present invention, with or without reasonable modification and/or variation, to other processes in the petroleum refining arts, and indeed other arts or industries, is clearly within the scope of the present disclosure and the appended claims to the invention.

In the hydrocarbon conversion art, for example catalytic cracking, the catalyst particles which are employed in fluid or fluidized condition must be recovered from the converted hydrocarbon vapors or gases for reuse or for regeneration. Such a recovery includes a catalyst particles from oil or hydrocarbon vapors or gases separation step and also a regenerated catalyst particles from regeneration, or other conditioning, gases or vapors separation step or operation. The said separations are usually accomplished employing centrifugal means, for example, cyclone separators which operate by virtue of a tangential introduction thereinto of the flowing mass of vapors and catalyst particles which have been entrained by the said vapors into the light phase which is present in the upper portion of a conversion or regeneration chamber from the dense phase of catalyst particles which is maintained in the lower section of the conversion or regenerator chamber. Owing to the difference between the densities of the solid catalyst particles and the vapors the particles move to the periphery of the cyclone and gravitate downward along the walls thereof, are collected at the bottom of the cyclone and conducted by their own weight through a dipleg, which dips into the dense phase of catalyst which is maintained at the bottom of the conversion or regenerator chamber. As will be readily understood by those skilled in the art there is an unavoidable pressure loss or differential through a cyclone separator and therefore the separated solid particles must be moved from a place of one pressure to the higher pressure of the dense phase in the lower portion or bottom of the chamber. Therefore, there will be a flow of vapors from the dense phase up through the dipleg into the cyclone, indeed into the vortex thereof, thus impeding its best operation. Furthermore, when a cyclone separator is but lightly loaded, as when it is a second or even a third stage cyclone separator, the particles separated per unit of time are insufficient to build a static head sufficient to prevent flow of particles from the dense phase up into the cyclone separator.

It is an object of this invention to provide a method and means for minimizing the flow of vapor and/or solid particles from a dense phase of finely divided solids suspended in said vapor into the vortex of a cyclone separator or zone of lower pressure of any device employed for the separation of such solids from said vapors.

Another object of this invention is to provide a method and means, for minimizing the said flow of vapors and/or solid particles, which do not require any vigilance, are self-contained and are independent of changes in the pressure differentials which have been described.

Other objects as well as advantages are apparent from this disclosure, the drawing and the appended claims.

According to the present invention there are provided a method and means for minimizing the flow of vapors and/or solids from a dense phase of solid particles suspended in said vapors to a zone of lower pressure through conducting means conducting back to said dense phase solid particles which have been separated from vapors withdrawn from said dense phase by which vapors the said particles have been entrained, which comprise placing in said conducting means means adapted to completely block off any flow of solids and/or vapor therethrough, the said last mentioned means being responsive to accumulation in said conducting means of solids being conducted back to said dense phase so that the said last mentioned means will open to allow accumulated solids to pass through said conducting means only when the weight of the said solids in the said conducting means is in excess of the weight required substantially to prevent said flow of vapors from the said dense phase to said zone of lower pressure and operating said means in said conducting means.

Obviously if the flow of vapors from the dense phase to said zone of lower pressure is prevented the flow of solids from said dense phase of solids to said zone of lower pressure is also prevented.

Figure 2:
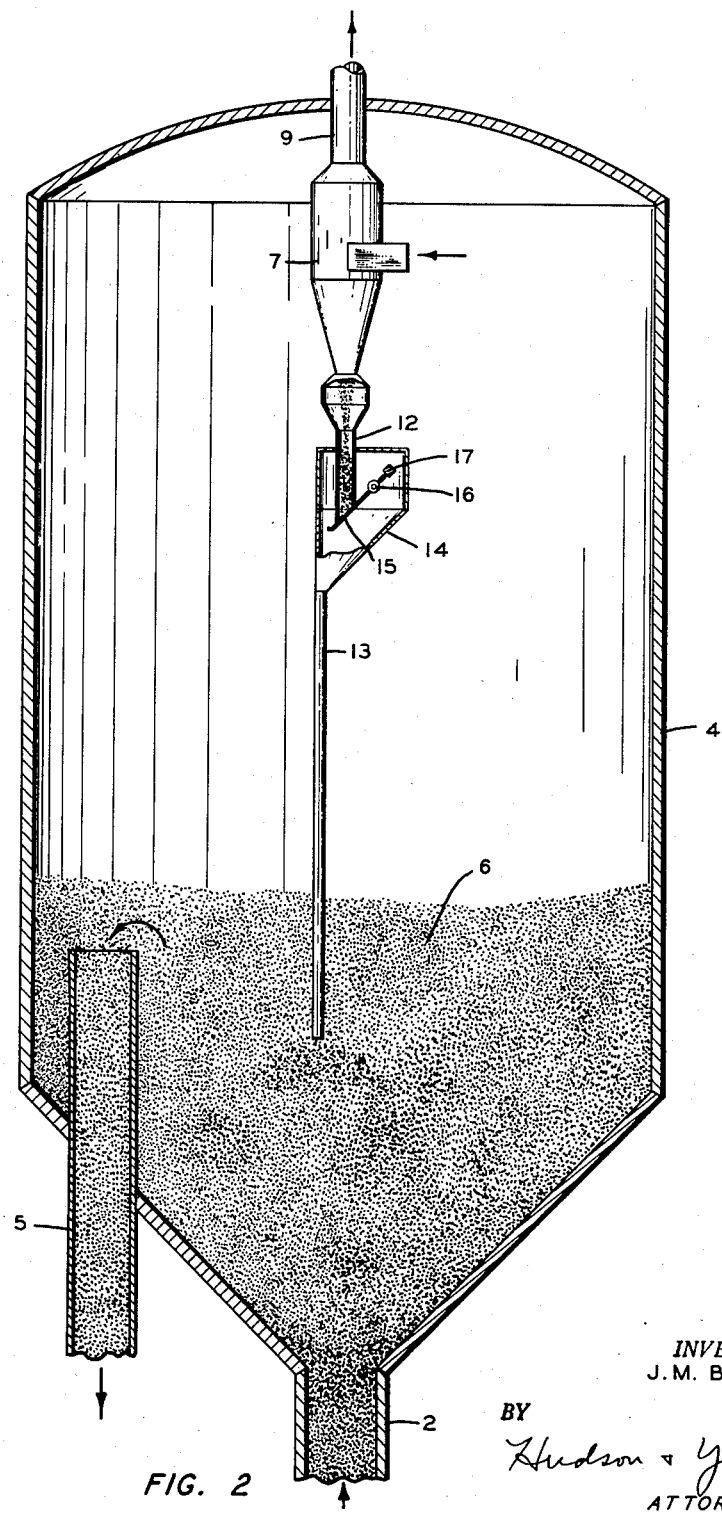

In the drawing Fig. 1 illustrates diagrammatically in an elevational view an apparatus which is suited for either the catalytic conversion of hydrocarbons or for the regeneration of catalyst which has become spent in the said conversion. Fig. 2 illustrates the apparatus of Fig. 1 as it has been modified according to one embodiment of the present invention. Fig. 3 is an elevational view of a modified embodiment of the invention disconnected from the remainder of the apparatus.

Referring now to Fig. 1, there is shown a prior art apparatus into which there is fed, through conduit 2, a suspension of solid particles, for example catalyst particles, in a fluid, for example, hydrocarbon oil vapors or catalyst regeneration gases. A dense phase of catalyst particles 3 is maintained in the bottom of chamber 4 from which catalyst particles, after a desired residence time are withdrawn through conduit 5. Fluid, unavoidably entraining with it some catalyst particles from the dense phase passes into the light phase 6 and into cyclone separator 7 in which the entrained catalyst particles settle out and from which the said particles are returned to the dense phase 3 through conductor means or dipleg 8. Fluid substantially freed from catalyst particles passes out from the cyclone separator 7 through conduit 9. In the prior art the length of the dipleg has been chosen so that the static head of catalyst particles in the dipleg overcomes the pressure differential existing between the top and the bottom ends of the said dipleg. However, operating conditions frequently occur that result in a cyclone separator being too lightly loaded, especially if separator 7 is a secondary or tertiary cyclone in series with a primary or secondary cyclone. In the event of the occurrence of such conditions the supply of solid particles per unit time to the dipleg 8 is often insufficient to maintain an adequate head in the dipleg, thus allowing excessive flow of fluid up the dipleg into the cyclone and even causing solids to be entrained in the fluid flowing up the dipleg.

Referring now to Fig. 2, in which elements which are shown in Fig. 1 have the same numerical designation, in place of the dipleg 8 there have been provided according to the invention, conduits 12 and 13, the upper portion of conduit 13 being of enlarged diameter to provide chamber 14. As shown conduit 12 extends into chamber 14 and conduit 13 extends to beneath the surface of the dense phase 3. At or near the bottom end of conduit 12 there is provided a flapper 15, pivoted at 16 and weighted at 17. The flapper, pivot and weight are so constructed and arranged that the flapper 15 will be in open position relative to conduit 12 only when the head of solid particles accumulated in pipe 12 is sufficient to provide a flow rate of solid particles therefrom which will maintain the desired high level of solid particles in conduit 13, thereby substantially preventing backflow of fluid and solids up conduit 13. The weight 17 will close flapper 15 before the weight of solids in conduit 12 becomes too low to maintain this desired condition in conduit 13. Flapper valve 16 will remain open during periods when cyclone 7 is handling a normal load of solids-containing fluid, but during periods of light loading of the cyclone the flapper alternately closes and opens in response to the variable head of solid particles above it. Other means to take the place of flapper 15, pivot 16 and weight 17 are within the skill of the art in possession of this disclosure and it is clear that the concept of the invention set forth herein is not limited to the elements or to their combination as shown.

It is a particular advantage of my invention that the moving parts of the flapper valve, i. e. the pivot means, are out of contact with any appreciable solid particles, which would cause impairment of the operation of such a flapper valve and eventual sticking because of fouling with such finely divided solids.

Referring now to Fig. 3, in which elements which are shown in Fig. 2 bear the same numerical designation, the flapper 15 is shown in open position, its closed position being indicated by the broken lines. In this embodiment of the invention the flapper 15 remains open when the weight of the catalyst in conduit 12 is sufficient to overcome the weight 17 and when the flapper 15 closes or rises its lifts vent 18 thus equalizing the pressure between section 14 and the light phase which is above the dense phase in the chamber 4 of Fig. 2. By such pressure equalization catalyst particles which are in section 14 and conduit 13 when flapper 15 closes will be enabled to flow through conduit 13 to the dense phase 3 of chamber 4 in Fig. 2.

Although only one separator is shown in chamber 4 of Fig. 2, the separator 7 may also represent the second or third of a series of separators, each succeeding separator being arranged to receive the fluid effluent from the preceding separator as will be readily understood by those skilled in the art. Indeed, since a light load most often occurs in a secondary or tertiary cyclone, it is in connection with these that the greatest need for the method and apparatus of the invention exists.

While the cyclone separators have been shown to be within the chamber 4 it is clear that these separators can be mounted without said chamber within the scope of the invention and the appended claims thereto.

Reasonable variation and modification are possible within the scope of the foregoing description, drawing and appended claims to the invention, the essence of which is that a method and apparatus for preventing backward flow of a fluidized mass of particles from a dense phase to a light phase in a solids-from-fluid separator, for example a cyclone separator, have been provided by providing a flapper valve and a flapper valve in combination with a vent valve substantially as set forth and described.

I claim:

1. An apparatus adapted to control upsurge of fluid within a chamber in which a fluidized bed of particulate solids is maintained in dense phase and in which at a locus above said bed there is withdrawn from said chamber a portion of said fluid from which particulate solids are removed in a solids-from-fluids separator means and said solids returned to said bed, which comprises a conduit adapted to be in open and particulate solids receiving communication at its upper end with said separator means and in communication with a place within said bed at its lower end; an enlarged portion in said conduit at a section intermediate its ends, the portion of said conduit above said enlarged portion extending into said enlarged portion and terminating therein and at its end being in open communication with the interior of said enlarged portion; an automatic closing means mounted at said end; means urging said closing means to a closed position against the weight of particulate solids in said portion of said conduit terminating in said enlarged portion; a venting means mounted upon said enlarged portion; and means connecting said closing means and said venting means to move the venting means to a venting position as the closing means are moved to a closed position and vice versa.

2. A combination according to claim 1 in which the closing means is a pivoted and counterweighted flap valve; said venting means is comprised of a closure for closing it when the flap valve is open and said means connecting said closing means and said venting means comprises a member attached to said closure and slideably engaging said flap valve.

3. An apparatus for contacting a fluid with finely divided solids, said apparatus comprising, in combination: a chamber having an inlet and an outlet means in a lower portion thereof and an outlet means at an upper portion thereof; a solids-from-fluid separator in an upper portion of said chamber and connected to said outlet at an upper portion of said chamber; a conduit connected to said separator, said conduit comprising an upper section, the lower end of which is equipped with a flap valve; a weight urging said flap valve to conduit-closing position, said valve being automatically responsive to the weight of separated solids in said upper section to open and allow flow of separated solids only from said upper section, and a lower section, of larger diameter at its upper than at its lower end, which upper end encloses said flap valve and sealingly surrounds the lower end of said upper section; venting means in said upper end of said lower section; and a linkage operatively connecting said flap valve and said venting means, said linkage engaging said flap valve and being attached to said vent in such a manner as to close said vent when said flap valve opens and to open said vent when said flap valve closes.

4. In an apparatus for contacting a fluid with a dense bed of fluidized solids, said apparatus comprising a chamber having inlet and outlet means at a lower part thereof, an outlet means at an upper part thereof, said outlet means at said upper part thereof being provided with solids-from-fluid separating means, the improvement which comprises, in combination: conduit means adapted to return separated solids from said separating means into said dense bed, said conduit means comprising an upper section, a lower section, and an intermediate section of larger diameter than said upper and lower sections and positioned above the upper level of said dense bed; means positioned within said intermediate section and responsive to the weight of the accumulated solids within said upper section to open the lower end of said upper section when the head of accumulated solids within said upper section exceeds a predetermined pressure and to close said lower end when said head is less than said pressure.

5. Apparatus according to claim 4 wherein said upper section extends into said intermediate section, and said means positioned within said intermediate section comprises a counterweighted flap valve.

References Cited in the file of this patent

UNITED STATES PATENTS

| Number | Name | Date |
|---|---|---|
| 1,761,627 | Hine | June 3, 1930 |
| 2,490,798 | Gohr et al. | Dec. 13, 1949 |
| 2,550,374 | Palmer | Apr. 24, 1951 |